(No Model.)
J. L. MARVIN.
ROD FOR FLUE CLEANERS.
No. 593,673. Patented Nov. 16, 1897.
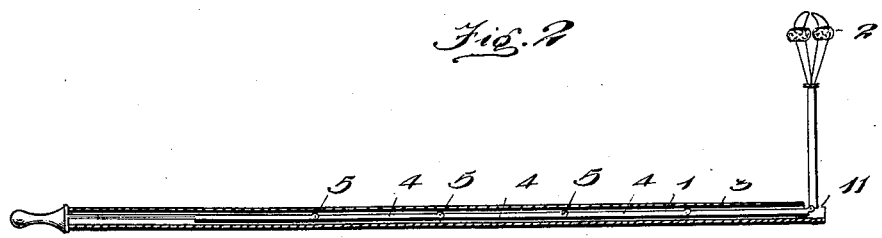
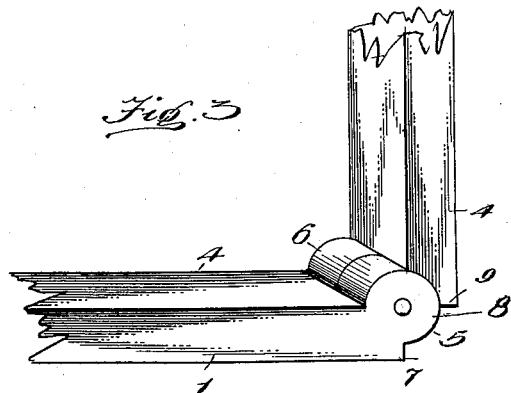
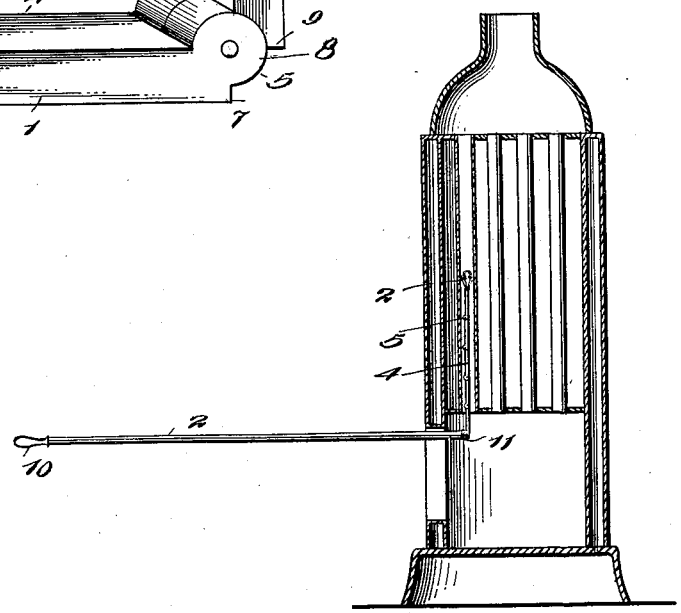
Witnesses
Inventor
Judson L. Marvin
by Edcen Bros
Attorneys
THE NORRIS PETERS CO., PHOTO-LITHO., WASHINGTON, D. C.

UNITED STATES PATENT OFFICE.

JUDSON L. MARVIN, OF MAUSTON, WISCONSIN.

ROD FOR FLUE-CLEANERS.

SPECIFICATION forming part of Letters Patent No. 593,673, dated November 16, 1897.

Application filed March 12, 1897. Serial No. 627,210. (No model.)

*To all whom it may concern:*

Be it known that I, JUDSON L. MARVIN, a citizen of the United States, residing at Mauston, in the county of Juneau and State of Wisconsin, have invented certain new and useful Improvements in Rods for Flue-Cleaners; and I do hereby declare the following to be a full, clear, and exact description of the invention, such as will enable others skilled in the art to which it appertains to make and use the same.

My invention relates to improvements in flue-cleaners, more especially to the staff or handle thereof, for the purpose of using the implement in obtaining access to the interior of the flues in either horizontal or vertical tube steam-boilers.

In the construction of a flue-cleaner for use in vertical-tube boilers regard must be had to the fact that the flues or tubes are not easily accessible for the purpose of sweeping sediment therefrom, because of the comparatively small area of the combustion-chamber or fire-box.

The object of my invention is to provide a simple construction of the staff of a flue-cleaner which while the implement is well adapted for use in scraping horizontal flues is yet especially designed for use advantageously in scraping the flues of vertical-tube boilers, the projecting end of the staff occupying a substantially horizontal position for convenient manipulation by the operator, while that part of the staff which is contained in the flues and sustains the scraper-head therein occupies a vertical position, provision being made in the implement for varying the length of the upright part of the staff without withdrawing the implement from service for the purpose of such adjustment.

To the accomplishment of these ends my invention consists in the combination, with any preferred style of scraper-head, of a sectional adjustable staff or rod in which the members are pivotally attached by joints that permit the members to turn freely in one direction, but limit them from turning in the opposite direction, and a slidable locking sheath or tube which is fitted to embrace the sections or members of the rod to hold those sections with which it engages in alinement with each other, said locking sheath or tube being adjustable at will on the staff to lengthen or shorten the upright length thereof when the implement is used for cleaning vertical-tube boilers; and the invention further consists in the construction and arrangements of parts which will be hereinafter fully described and claimed.

To enable others to understand my invention, I have illustrated the preferred embodiment thereof in the accompanying drawings, forming a part of this specification, and in which—

Figure 1 is an elevation of a flue-cleaner the staff of which is constructed in accordance with my invention. Fig. 2 is a sectional elevation, the adjustable sheath or tube being shown in section to partially embrace the jointed staff, one part of said staff being turned to an upright position. Fig. 3 is a detail view of two sections of the staff, showing the preferred form of joint. Fig. 4 is a view illustrating the manner of using the flue-cleaner in a vertical-tube boiler.

Like numerals of reference denote corresponding parts in all the figures of the drawings, referring to which—

1 designates the staff of the implement. 2 is the cleaner-head, and 3 is the adjustable locking tube or sheath.

The staff 1 is made or composed of a series of members or sections (indicated at 4) which are connected together by the hinge-joints 5. These joints are of such construction that they permit either section to turn in one direction to assume a position at right angles to the length of the tube or sheath 3; but the sections are limited by said joints from turning in the other direction to a position beyond the axis of an adjacent section. Each section is provided at one end with an offstanding ear 6 and a straight abutment or face 7 and at its opposite end with a central offstanding lug 8 and an abutment or face 9. The members are assembled by fitting the lug 8 of one section against the ear 6 on an adjacent section and passing a pivotal pin through said ears in a manner to connect the sections together for the edges 7 9 thereof to abut together when the sections are alined with each other, but enabling either section to turn to a position at right angles to an adjacent section, as will be readily understood.

The locking tube or sheath is of a length substantially equal to the combined length of all the sections forming the jointed staff, and in cross-section this tube or sheath is of a shape and size to closely embrace the jointed staff, while permitting the tube or sheath to move freely over the staff. The sheath or tube is open at one end, but I prefer to close the other end and form it to make a handle 10, whereby the implement may be conveniently grasped. This sheath may be adjusted to embrace two, three, or more sections of the staff, and all sections so embraced are held by the tube or sheath against bending or turning on the pivotal joints, such sections embraced by the tube being held in alinement with each other.

The cleaner-head 2 may be of any preferred construction, and it is attached to the end section or member of the staff opposite to that portion of the staff upon which the slidable tube or sheath is fitted.

In using the implement in horizontal-tube boilers the sheath or tube is adjusted to embrace the staff practically throughout its entire length, and it is used in the flue by drawing the implement back and forth therein to cause the head 2 to scrape the tubes and remove the sediment therefrom. The implement, however, is especially useful in cleaning vertical-tube boilers in the manner indicated by Fig. 4, in which the end section of the staff carrying the cleaner-head is passed through the combustion-chamber or fire-box and introduced into a flue. Then the sheath or tube is withdrawn far enough to expose the second section and the implement shoved forward to cause the second section to enter the flue and raise the head higher up therein, the operation being repeated until the head is raised the desired distance. The horizontal part of the jointed staff is held rigid by the engagement of the locking-sheath therewith, and the implement is operated by operating the staff in a vertical direction to raise and lower the head and cause the latter to scrape the sediment from the surfaces of the flues or tubes. To withdraw the implement, the end of the staff is dropped until the section next to the locking-tube is below the bottom of the boiler-flue, the implement is drawn toward the operator and at the same time lifted to bring said section in alinement with the horizontal part of the staff, and the tube or sheath is slid forward over the joint, this operation being repeated until the sectional staff and head are withdrawn from the boiler-flue.

When the end of the sectional staff that carries the cleaner-head is turned to a position at right angles to the major length of the staff, as when the device is adjusted for service in a vertical-flue boiler, as shown by Fig. 4, the upright part of the staff is liable to turn or move sidewise because said sectional staff has no locking engagement with the sheath. To overcome this objection, I provide in the end of the sheath, in the upper side thereof, a seat 11 for the upright part of the staff, which seat is in the form of a notch cut in the end of the upper side of the sheath and extending inwardly a suitable distance, so that the sheath may be shoved endwise to cause the upright part of the staff to enter the notch-like seat and hold the sheath and staff together against sidewise or tilting movement of the staff within the sheath.

My improved implement is simple and light in construction, easily adjusted for service in any style of boiler-tubes, and it is cheap of manufacture.

I am aware that changes in the form and proportion of parts and in the details of construction herein shown and described as the preferred embodiment of my invention may be made by a skilled mechanic without departing from the spirit or sacrificing the advantages of my invention.

Having thus fully described my invention, what I claim as new, and desire to secure by Letters Patent, is—

1. In a flue-cleaner, the combination of a sectional staff having its members attached pivotally together, and a locking tube or sheath fitted slidably on said sectional staff and adjustable longitudinally thereon by hand, said locking tube or sheath serving to hold in rigid relation to each other all the members of the staff inclosed thereby and permitting the staff members projected beyond said tube to assume an upright position at an angle to the length of the staff and enable said upright sections to carry a cleaner-head, as and for the purposes described.

2. In a flue-cleaner, the sectional staff having its members pivoted together by butt-joints arranged to permit the sections to turn in one direction and to limit the turning movement thereof in the opposite direction to positions where the sections are in alinement, combined with a locking tube or sheath slidably fitted on the horizontal length of said staff and serving to hold in rigid relation to each other all the members of the staff inclosed thereby, and a cleaner-head carried by a section at one end of the staff, as and for the purposes described.

3. In a flue-cleaner, the sectional staff having its members pivoted together and adapted to carry at one end a cleaner-head which may be turned with one or more sections at right angles to the major part of the length of said staff, combined with a locking sleeve or sheath which embraces said sectional staff and is provided with a notch-like seat adapted to receive the upright part of the staff and restrain the latter against sidewise movement, as set forth.

In testimony whereof I affix my signature in presence of two witnesses.

JUDSON L. MARVIN.

Witnesses:
E. V. BENJAMIN,
H. A. THOMPSON.